Patented Apr. 19, 1932

1,854,176

UNITED STATES PATENT OFFICE

BRUCE K. BROWN, OF PELHAM, NEW YORK

PRIMARY CELL

No Drawing.   Application filed July 16, 1928. Serial No. 293,305.

My invention relates to an improved primary cell and pertains more particularly to the use of a soluble titanium compound in the electrolyte of such a cell. While generally applicable to primary cells, my invention is particularly useful in connection with the Le Clanche type of cell.

The Le Clanche cell consists of a zinc electrode and a carbon electrode immersed in an electrolyte containing ammonium chloride and zinc chloride. When the electrodes of such a cell are connected, a current flows. Zinc chloride is formed at the zinc electrode and hydrogen and ammonia are generated at the carbon. Such a cell would polarize very quickly, were it not for the presence of a solid depolarizer which is placed around the electrode. This consists, usually, of manganese dioxide rendered conductive by admixture with carbon or graphite. The hydrogen reacts with the manganese dioxide, producing water, and polarization is thus prevented. Such a cell produces an E. M. F. of about 1.5 volts when first put in use, but the internal resistance of the cell increases with use and there is a gradual polarization accompanied by a loss in voltage and amperage.

The use of the Le Clanche cell is widespread, particularly in the dry cell form. Reference is made to "Primary Batteries" by W. R. Cooper, 1920 edition published by Benn Brothers and to Circular No. 79 of the U. S. Bureau of Standards, published by the Government Printing Office in 1923, where the art is well summarized.

In the dry cell form of the Le Clanche cell, the manganese dioxide depolarizer is formed as a moist core around the carbon electrode. This core is usually wrapped in some bibulous material and placed in a zinc can electrode which contains an ammonium chloride—zinc chloride electrolyte made pasty by the presence of starch or some other cereal (c. f. Schulte, U. S. Patent 1,370,056). Graphitic oxide or solid oxide of carbon may be used as the depolarizer in place of manganese dioxide. This material may be manufactured in accordance with the method disclosed in my prior Patent No. 1,639,980. Its use in a dry cell is described in my prior Patent 1,639,983. Solid oxide of carbon may be used in admixture with manganese dioxide as disclosed in my prior Patents 1,639,984–5.

I have now discovered a method of improving the depolarizing action in the Le Clanche type of cell, and by means of my invention I produce a cell which does not deteriorate so rapidly on closed circuit and which produces a higher voltage during continuous discharge.

It is a fact well known to those skilled in the art that the depolarizing action of the Le Clanche type of cell is ineffiecient. When manganese dioxide is used as the depolarizer the cell "runs down"—i. e. diminishes in voltage and amperage and increases in internal resistance—long before all of the manganese dioxide present is reduced to the manganous form. This may be due to the local nature of the depolarizing action which seems to take place only in the vicinity of the depolarizer itself. It may also be partly due to the adsorption of ammonia.

In the case of a Le Clanche type of cell employing a depolarizer of oxidized carbon, this effect is even more noticeable. The effective voltage on closed circuit is even lower than in the case of cells depolarized with manganese dioxide. This may be due to the fact that the potential difference in the cell may be that between oxygen and carbon or between carbon oxide and zinc but I think it is more probably due to the purely physical character of the depolarization. In other words a part of the depolarizing action of $MnO_2$ may be due to the formation of quadravalent manganese ions, whereas no such possibility exists in the case of oxidized carbon. In this latter case the oxygen content of the solid oxide is quite possibly adsorbed by the carbon, which is generally supposed to be a colloidal oxide. In any event it is obvious that depolarization must occur only as the result of contact of the hydrogen ions, and possibly gaseous hydrogen, with the depolarizer.

I have now discovered that the depolarizing action of the Le Clanche type of cell may be improved, and the voltage during discharge thus sustained, by the use of an electrolyte containing what may be called "an oxidation transfer agent". Suitable agents for this purpose are the salts of metals such as titanium, vanadium and cerium which are characterized by the ease with which their salts of higher valence are reduced by hydrogen and the avidity with which the salts of lower valence react with oxygen, or other oxidizing agents to produce the salts of higher valence.

For example I may prepare an electrolyte containing ammonium chloride and from 5-50% of titanium tetrachloride. Zinc chloride and other salts may also be present if desired. I may use said electrolyte in a Le Clanche cell of either the wet or so-called dry type. When current flows in such a cell the first effect of the generation of hydrogen is to reduce the tetravalent titanium to trivalent titanium. In this respect the tetravalent titanium acts momentarily, as a depolarizer. However the trivalent titanium is itself an excellent active reducing agent and it reacts with the depolarizer to reduce the same, being reoxidized to tetravalent titanium in the process. Depolarization is thus improved on account of the active reducing agent present in solution. The deposition of gaseous hydrogen in the depolarizer particles is avoided.

The effect of my invention is to greatly improve the depolarizing action of manganese dioxide in an ordinary Le Clanche cell but the advantage is even more striking in the case of a cell in which a solid oxide of carbon is used as the depolarizer. In this latter type of cell, depolarization is probably purely physical and may take place, in the greatest degree, only between gaseous hydrogen and the solid carbon oxide. When tetravalent titanium is present in the electrolyte it is reduced—in solution—by the generation of hydrogen ions during cell discharge. The resultant trivalent titanium is reoxidized by the solid carbon oxide as rapidly as it is formed. In any event the effect of the presence of the titanium salt to elevate the discharge rate in closed circuit and to greatly improve the cell.

While I have described the use of chloride of titanium in my improved cell, I may alternatively employ the chlorides of cerium, vanadium, or other similar metals.

While I have described my invention in connection with the Le Clanche type of cell it may obviously be used in other cells. For example I may prepare a cell having electrodes of carbon and iron and I may employ titanic sulfate or ceric sulfate as an ingredient of the electrolyte.

Now having described my invention, I claim the following as new and novel:—

1. In a primary cell containing a depolarizer and a carbon electrode, an electrolyte containing a salt of titanium.

2. In a primary cell containing a depolarizer and a carbon electrode, an electrolyte containing a chloride of titanium.

3. In a primary cell, the combination of a metal electrode, a carbon electrode surrounded by a solid depolarizer, and an electrolyte containing a salt of titanium.

4. In a Le Clanche type primary cell, an electrolyte containing a chloride of titanium.

5. In a Le Clanche type primary cell, the combination of a zinc electrode, a carbon electrode surrounded by a solid depolarizer, and an electrolyte containing a chloride of titanium.

6. In a Le Clanche type primary cell, the combination of a zinc electrode, a carbon electrode surrounded by a solid depolarizer containing a carbon oxide, and an electrolyte containing a chloride of titanium.

In testimony whereof, I have signed my name to this specification this 2nd day of July, 1928.

BRUCE K. BROWN.